（12）United States Patent
Park et al.

(10) Patent No.: US 7,944,405 B2
(45) Date of Patent: May 17, 2011

(54) DUAL DISPLAY DEVICE (75) Inventors: Young-Joo Park, Hwaseong-si (KR); Jin-Oh Kwag, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 908 days.

(21) Appl. No.: 11/772,491

(22) Filed: Jul. 2, 2007

(65) Prior Publication Data
US 2008/0122735 A1 May 29, 2008

(30) Foreign Application Priority Data

Jul. 6, 2006 (KR) .................. 10-2006-0063355

(51) Int. Cl.
G09G 5/00 (2006.01)
G09G 3/36 (2006.01)
(52) U.S. Cl. ............ 345/1.1; 345/98; 345/100; 345/169
(58) Field of Classification Search ............ 345/1.1–1.3, 345/2.1–2.2, 3.1–3.3, 87, 98–100, 169
See application file for complete search history.

(56) References Cited

U.S. PATENT DOCUMENTS

| 7,161,185 | B2 * | 1/2007 | Yamazaki et al. | 257/88 |
| 7,199,520 | B2 * | 4/2007 | Fujii et al. | 313/506 |
| 7,333,077 | B2 * | 2/2008 | Koyama et al. | 345/76 |
| 2005/0264471 | A1 * | 12/2005 | Yamazaki et al. | 345/1.1 |

FOREIGN PATENT DOCUMENTS

| CN | 1492260 | 4/2004 |
| CN | 1635567 | 7/2005 |

* cited by examiner

*Primary Examiner* — Duc Q Dinh
(74) *Attorney, Agent, or Firm* — Cantor Colburn LLP (57) ABSTRACT A dual display device includes a display panel having a first surface and an opposing second surface, and including a plurality of first pixels displaying an image on the first surface and a plurality of second pixels displaying an image on the second surface, a gate driver supplying gate signals to the first and second pixels, a signal controller including first and second receivers receiving input image signals and generating first and second output image signals based on the input image signals, and a data driver analog-converting the first and second output image signals to generate first and second data voltages, respectively, and supplying the first and second data voltages to the first and second pixels, respectively. By using two different interfaces, memories can be reduced by driving transmissive pixels and reflective pixels independently, and different normal images can be displayed on both surfaces of the display panel. When the same image is displayed on both surfaces, only one interface is selectively driven to thereby reduce power consumption.

21 Claims, 8 Drawing Sheets

DUAL DISPLAY DEVICE

This application claims priority to Korean Patent Application No. 10-2006-0063355, filed on Jul. 6, 2006, and all the benefits accruing therefrom under 35 U.S.C. §119, the contents of which in its entirety are herein incorporated by reference.

BACKGROUND OF THE INVENTION (a) Field of the Invention

The present invention relates to a display device, and more particularly to a dual display device.

(b) Description of the Related Art

Generally, a liquid crystal display device includes a pair of panels provided with pixel electrodes and a common electrode, and a liquid crystal layer with dielectric anisotropy interposed between the panels. The liquid crystal display device controls the transmittance of light passing through the liquid crystal layer by applying an electric field to the liquid crystal layer and adjusting the field strength for displaying desired images.

Because the LCD device is a light-receiving device which is incapable of self-emitting light, light emitted by lamps of a separately provided backlight unit passes through the liquid crystal layer, or external light, such as natural light, passes through the liquid crystal layer twice by reflection. The first described LCD device is called a "transmissive" type of LCD device and the latter described LCD device is called a "reflective" type of LCD device. The reflective type of LCD device is commonly used in medium and small display devices. Another type of LCD device is a "transflective" or "reflective-transmissive" LCD device which is capable of selectively using light from the backlight unit and external light in response to existing circumstances. The transflective LCD device is commonly used in medium and small display devices.

In the transflective LCD device, each pixel has a transparent electrode and a reflective electrode electrically connected to each other. The light emitted from the backlight unit passes through the transparent electrode for use in display and the external light entering from the opposite side of the backlight unit is reflected from the reflective electrode for use in display. Therefore, images are always displayed on only one surface of the liquid crystal panel assembly.

Accordingly, in this case, when the liquid crystal panel assembly is viewed from the other opposite side surface, an image whose left and right are reversed is seen.

When it is desired to display an image on both side surfaces in a mobile phone or the like, two liquid crystal panel assemblies overlap each other so that only the outer surfaces of each of the two liquid crystal panel assemblies are used for display. However, although an image can be displayed on both sides of the display device, the thickness of the overall display device is larger.

BRIEF SUMMARY OF THE INVENTION

An aspect of the present invention provides a dual display device which displays images with identical or different constant phases on both side surfaces, and reduces the capacitance of the device.

To overcome the above-described problems, according to one exemplary embodiment of the present invention, a display device includes: a display panel having a first surface and a second surface facing each other, and including a plurality of first pixels for displaying an image on the first surface and a plurality of second pixels displaying an image on the second surface; a gate driver supplying gate signals to the first and second pixels; a signal controller including first and second receivers receiving input image signals, and generating first and second output image signals based on the input image signals; and a data driver that analog-converts the first and second output image signals to generate first and second data voltages, respectively, and supplies the first and second data voltages to the first and second pixels, respectively.

The first pixels and the second pixels may be arranged in an alternating fashion. The display panel may include data lines connected to the first and second pixels, and the data driver may apply the first data voltage and the second data voltage to the data lines in an alternating fashion.

The first pixel may include a transmissive pixel electrode, and the second pixel may include a reflective pixel electrode.

The dual display device may further include a backlight unit irradiating light toward the display panel, wherein the transmissive pixel electrode may transmit the light from the backlight unit toward the first surface of the display panel, and the reflective pixel electrode may reflect the light from the backlight unit toward the second surface thereof.

The signal controller may further include a signal arrangement unit generating the first output image signal and the second output image signal based on the input image signals received from at least one of the first and second receivers, and outputting the first output image signal and the second output image signal to the data driver in an alternating fashion.

The first receiver may include a first memory unit which stores the image signals, and which may be controlled by an external control signal.

The input image signals may include a first input image signal to be displayed on the first surface and a second input image signal to be displayed on the second surface, the first receiver may receive the first input image signal to store the same in the first memory unit, the second receiver may receive the second input image signal to output the same, and the signal arrangement unit may generate the first output image signal from the first input image signal and the second output image signal from the second input image signal.

The signal arrangement unit may include: a second memory unit receiving the first input image signal from the first memory unit to store the same therein; a third memory unit receiving the second input image signal from the second receiver to store the same therein, and a fourth memory unit receiving the first input image signal and the second input image signal from the second memory unit and the third memory unit in an alternating fashion to store the same therein.

An image of the first pixels and an image of the second pixels may be different from each other.

An image viewed from the first surface of the display panel and an image viewed from the second surface thereof may be identical to each other.

The signal controller may generate the first output image signal and the second output image signal based on the input image signals received from at least one of the first and second receivers.

In this case, the signal controller may further include a first switching unit selecting one of the first and second receivers and transmitting the input image signals thereto.

The first switching unit may include: a first switch monitoring the connection between the first receiver and the input image signals; and a second switch monitoring the connection between the second receiver and the input image signals and operating opposite to the first switch. Alternatively, the first switching unit may include a switch connected to the input image signals and selectively connected to one of the first and second receivers.

The signal arrangement unit may include a delay unit delaying the input image signals.

The signal arrangement unit may further include a second memory unit connected to the first receiver and a third memory unit connected to the second receiver, and the signal arrangement unit may have an output terminal.

The delay unit may receive the input image signals from one of the second and third memory units. Alternatively, the delay unit may receive the input image signals from one of the first and second receivers and output the input image signals to one of the second and third memory units.

The signal arrangement unit may include a second switching unit monitoring the connection among the second memory unit, the third memory unit, the delay unit and the output terminal. The second switching unit may include a first switch monitoring the connection between the second memory unit or the third memory unit and the output terminal, a second switch monitoring the connection between the second memory unit or the third memory unit and the delay unit, and a third switch monitoring the connection between the delay unit and the output terminal. At this time, a conduction time of the first switching unit and the second switching unit may be different from a conduction time of the third switching unit.

The signal arrangement unit may output the first output image signal and the second output image signal in a reverse order.

BRIEF DESCRIPTION OF THE DRAWINGS

The present invention will become more apparent by describing exemplary embodiments thereof in more detail with reference to the accompanying drawings, in which.

DETAILED DESCRIPTION OF THE INVENTION

The present invention now will be described more fully hereinafter with reference to the accompanying drawings, in which exemplary embodiments of the present invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. Further, it will be understood that when a first element is referred to as being "on" a second element, the first element may be above or below the second element. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

The present invention will be described more fully hereinafter with reference to the accompanying drawings, in which exemplary embodiments of the present invention are shown. As those skilled in the art would realize, the described exemplary embodiments may be modified in various different ways, all without departing from the spirit or scope of the present invention.

Figure 1:
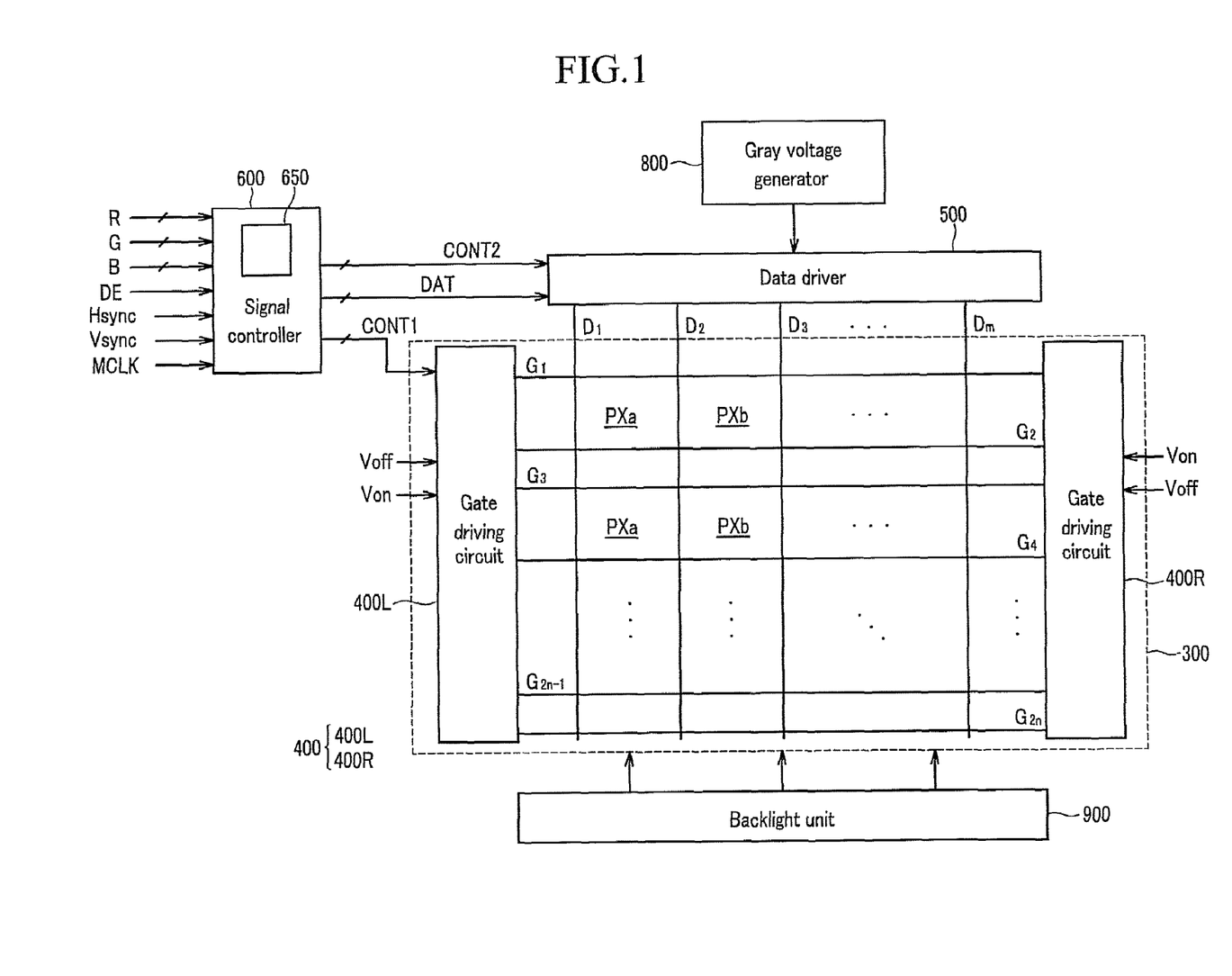
FIG. 1 is a block diagram of a liquid crystal display device according to an exemplary embodiment of the present invention.
Figure 2:
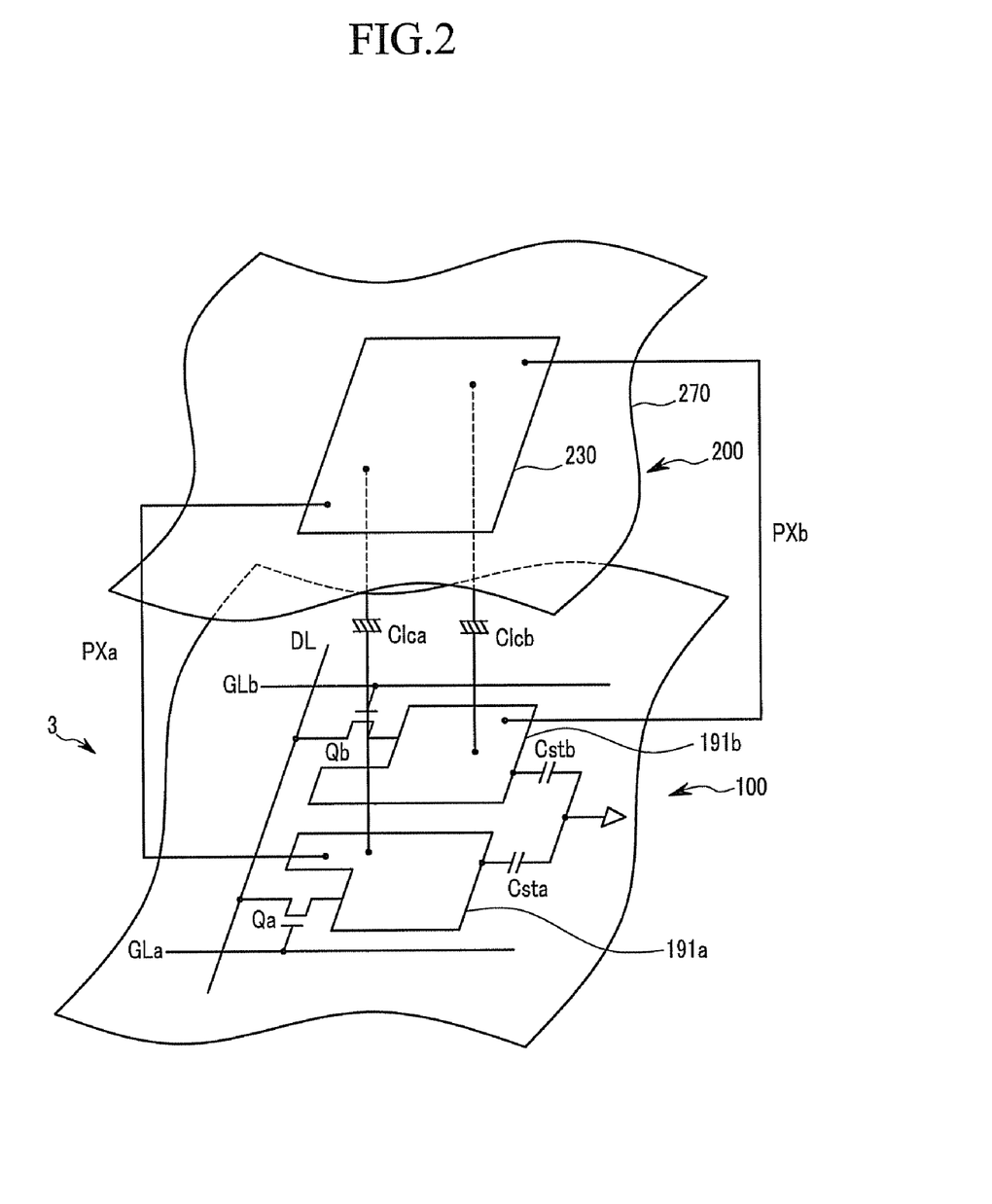
FIG. 2 is an equivalent circuit schematic diagram of one pixel in a liquid crystal display device according to an exemplary embodiment of the present invention.

FIG. 1 is a block diagram of a liquid crystal display device according to an exemplary embodiment of the present invention. FIG. 2 is an equivalent circuit schematic diagram of one pixel in a liquid crystal display device according to an exemplary embodiment of the present invention.

As shown in FIG. 1, a liquid crystal display device according to an exemplary embodiment of the present invention includes a liquid crystal panel assembly 300, a gate driver 400, a data driver 500, a gray voltage generator 800, a backlight unit 900 and a signal controller 600.

The liquid crystal panel assembly 300 includes a plurality of signal lines $G_1$-$G_{2n}$ and $D_1$-$D_m$ and a plurality of first and second pixels PXa and PXb connected thereto and arranged substantially in a matrix configuration. The liquid crystal panel assembly 300 shown in FIG. 2 includes lower and upper panels 100 and 200 facing each other, and a liquid crystal layer 3 interposed therebetween.

The signal lines $G_1$-$G_{2n}$ and $D_1$-$D_m$ include a plurality of first and second gate lines $G_1$-$G_{2n}$ transmitting gate signals (called scanning signals), and a plurality of data lines $D_1$-$D_m$ transmitting data signals. The gate lines $G_1$-$G_{2n}$ extend substantially in a row direction and are substantially parallel to each other, while the data lines $D_1$-$D_m$ extend substantially in a column direction crossing the gate lines $G_1$-$G_{2n}$ and are substantially parallel to each other.

The first pixel PXa and the second pixel PXb each display images on opposite surfaces of the liquid crystal panel assembly 300. For instance, if the first pixel PXa displays an image on the rear surface of the liquid crystal panel assembly 300, the second pixel PXb displays an image on the front surface thereof, or vice versa.

Referring to FIG. 2, the first and second pixels PXa and PXb forming a pair are connected to corresponding gate lines GLa and GLb, respectively, and are connected to one data line DL. Each pixel PXa/PXb includes a switching element Qa/Qb connected to the signal lines GLa/GLb and DL, a liquid crystal capacitor Clca/Clcb, and a storage capacitor Csta/Cstb.

The switching element Qa/Qb, such as a thin film transistor ("TFT"), for example, is provided on the lower panel 100 and has three terminals: a control terminal connected to the gate line GLa/GLb; an input terminal connected to the data line DL; and an output terminal connected to the liquid crystal capacitor Clca/Clcb and the storage capacitor Csta/Cstb.

The liquid crystal capacitor Clca/Clcb includes a pixel electrode 191a/191b provided on the lower panel 100 and a common electrode 270 provided on the upper panel 200 as two terminals. The liquid crystal layer 3 disposed between the two electrodes 191a/191b and the common electrode 270 functions as a dielectric material. The pixel electrode 191a/191b is connected to the switching element Qa/Qb, and the common electrode 270 is supplied with a common voltage Vcom and covers the entire surface of the upper panel 200. Alternatively, the common electrode 270 may be provided on the lower panel 100, and at least one of the two electrodes 191a/191b and the common electrode 270 may have shapes of bars or stripes. The first pixel electrode 191a may be a transparent transmissive electrode, and the second pixel electrode 191b may be a reflective electrode, or vice versa.

The storage capacitor Csta/Cstb is an auxiliary capacitor for the LC capacitor Clca/Clcb. The storage capacitor Clca/Clcb includes the pixel electrode 191a/191b and a separate signal line which is provided on the lower panel 100. The storage capacitor Clca/Clcb overlaps the pixel electrode 191a/191b via an insulator, and is supplied with a predetermined voltage such as the common voltage Vcom.

For color display, each pixel PXa and PXb uniquely represents one of primary colors (e.g., spatial division) or each pixel Pxa and PXb sequentially represents the primary colors in turn (e.g., temporal division) such that a spatial or temporal sum of the primary colors is recognized as a desired color. An example of a set of the primary colors includes red, green and blue colors, for example, but is not limited thereto. FIG. 2 shows an example of spatial division in which the pair of pixels PXa and PXb includes a color filter 230 representing one of the primary colors in an area of the upper panel 200 facing the pair of pixel electrodes 191a and 191b. Alternatively, the color filter 230 is provided on or under the pixel electrodes 191a/191b on the lower panel 100.

At least one polarizer (not shown) is attached to an outer surface of the liquid crystal panel assembly 300.

A detailed structure of the liquid crystal panel assembly 300 according to an exemplary embodiment of the present invention will now be described in more detail with reference to FIGS. 3 to 5.

Figure 3:
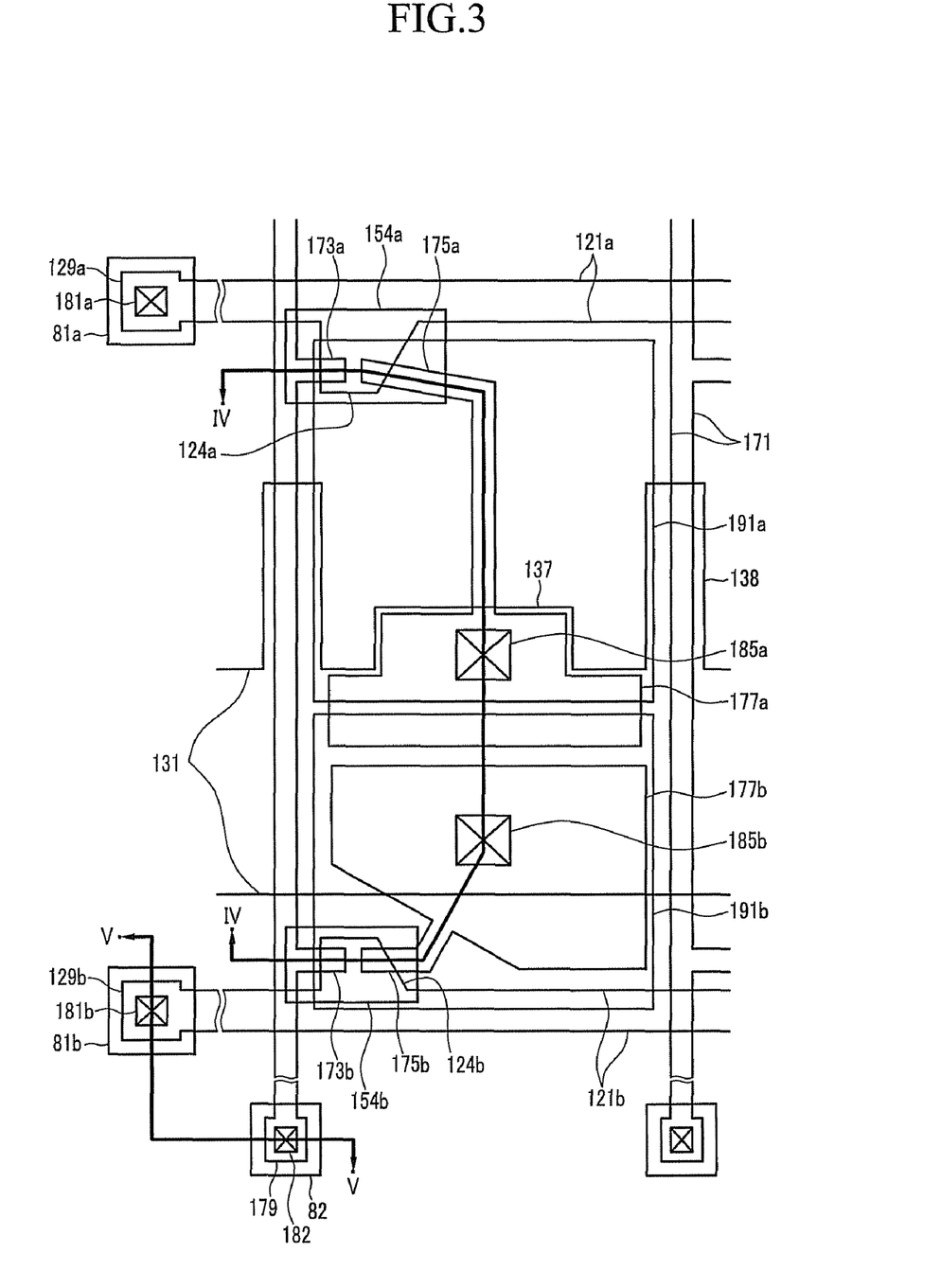
FIG. 3 is a plan view layout of a liquid crystal panel assembly according to an exemplary embodiment of the present invention.

FIG. 3 is a layout view of a liquid crystal panel assembly according to an exemplary embodiment of the present invention. FIG. 4 is a cross-sectional view of the liquid crystal panel assembly taken along line IV-IV in FIG. 3. FIG. 5 is a cross-sectional view of the liquid crystal panel assembly taken along line V-V in FIG. 3.

The liquid crystal panel assembly 300 according to the present exemplary embodiment includes a thin film transistor array panel 100 and a common electrode panel 200 facing each other, and a liquid crystal layer 3 interposed between the two panels 100 and 200.

First, the thin film transistor array panel 100 will be described in more detail.

A plurality of first and second gate lines 121a and 121b and a plurality of storage electrode lines 131 are disposed on an insulating substrate 110 made of transparent glass or the like.

The gate lines 121a and 121b substantially extend in a transverse direction and are arranged in an alternating fashion, as illustrated in FIG. 3. The first gate lines 121a include a plurality of first gate electrodes 124a protruding downward and a plurality of end portions 129a having a wider area than the first gate lines 121a for connection to other layers or external apparatuses (not shown). The second gate lines 121b include a plurality of second gate electrodes 124b disposed under the first gate lines 121a and protruding upward and a plurality of end portions 129b having a wider area than the second gate lines 121b for connection to other layers or external apparatuses (not shown). A gate driving circuit (not shown) for generating gate signals may be mounted on a flexible printed circuit film (not shown), which may be attached to the substrate 110, directly mounted on the substrate 110, or integrated onto the substrate 110. The gate lines 121a and 121b may extend to be connected to a gate driving circuit which may be integrated on the substrate 110.

The storage electrode lines 131 are supplied with a predetermined voltage, and extend somewhat parallel to the gate lines 121a and 121b, as illustrated in FIG. 3. Each of the storage electrode lines 131 is disposed between the first gate lines 121a and the second gate lines 121b so as to be closer to the second gate lines 121b disposed at lower sides. The storage electrode lines 131 include projections 137 and 138 protruding upward, as illustrated in FIG. 3. The shapes and arrangement of the storage electrode lines 131 may be modified in various manners.

The gate lines 121a and 121b and the storage electrode lines 131 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), titanium (Ti), or tantalum (Ta). However, the gate lines 121a and 121b and the storage electrode lines 131 may have a multi-layered structure including two conductive layers (not shown) having different physical properties. One of the two conductive layers is made of a metal having low resistivity, for example, an aluminum-based metal, a silver-based metal, or a copper-based metal, in order to reduce signal delay or voltage drop. The other conductive layers are made of a material having good contact characteristics to other materials, particularly to indium tin oxide ("ITO") or indium zinc oxide ("IZO"), such as a molybdenum-based metal, chromium, titanium, or tantalum. As preferred exemplary embodiments thereof, there are a combination of a lower chromium layer and an upper aluminum (alloy) layer and a combination of a lower aluminum (alloy) layer and an upper molybdenum (alloy) layer. However, the gate lines 121a and 121b and the storage electrode lines 131 may be made of various metals and conductive materials not explicitly listed herein.

The side surfaces of the gate lines 121a and 121b and the storage electrode lines 131 are slanted with respect to a surface of the substrate 110 so as to form an angle in the range of about 30° to about 80° with respect to the substrate 110.

A gate insulating film 140 made of a silicon nitride ("SiNx"), silicon oxide ("SiOx"), or the like, is formed on the gate lines 121a and 121b and the storage electrode lines 131.

A plurality of first and second island-type semiconductors 154a and 154b made of hydrogenated amorphous silicon (abbreviated to "a-Si") or polysilicon are formed above the gate insulating film 140. The semiconductors 154a and 154b are disposed on the gate electrodes 124a and 124b, respectively.

A plurality of pairs of first island-type ohmic contact members 163a and 165a are formed over the first semiconductors 154a, and a plurality of pairs of second island-type ohmic contact members 163b and 165b are formed over the second semiconductors 154b. The ohmic contacts 163a, 163b, 165a and 165b are made of silicide or an n+ hydrogenated amorphous silicon or the like which is heavily doped with n-type impurities.

The side surfaces of the semiconductors 154a and 154b and the ohmic contact members 163a, 163b, 165a and 165b are slanted with respect to the surface of the substrate 110 to form an angle in the range of about 30° to about 80° with respect to the substrate 110.

A plurality of data lines 171 and a plurality of first and second drain electrodes 175a and 175b are formed on the ohmic contact members 163a, 163b, 165a and 165b and the gate insulating film 140.

The data lines 171 substantially extend in a longitudinal direction to intersect the gate lines 121a and 121b and the storage electrode lines 131, as illustrated in FIG. 3, and transmit the data signals. Each of the data lines 171 has a plurality of first and second source electrodes 173a and 173b, respectively, which extend toward the gate electrodes 124a and 124b, and end portions 179 which have enlarged widths for connection to other layers or external apparatuses (not shown). A data driving circuit (not shown) for generating data signals may be mounted on a flexible printed circuit film (not shown), which may be attached to the substrate 110, directly mounted on the substrate 110, or integrated onto the substrate 110. The data lines 171 may extend to be connected to a data driving circuit which may be integrated on the substrate 110.

The first and second drain electrodes 175a and 175b are separated from the data lines 171 and disposed opposite the source electrodes 173a and 173ba with respect to the first and second gate electrodes 124a and 124b. Each of the drain electrodes 175a and 175b includes an end portion having an enlarged portion 177a/177b and a bar-shaped end portion, as illustrated in FIG. 3. The enlarged portion 177a/177b has a large area which overlaps the storage electrode lines 131, and the bar-shaped end portion is disposed opposite the source electrodes 173a and 173b.

One gate electrode 124a/124b, one source electrode 173a/173b, and one drain electrode 175a/175b together with the semiconductor 154a/154b constitute one thin film transistor ("TFT"), and channels of the thin film transistor are formed on the semiconductor 154a/154b between the source electrode 173a/173b and the drain electrode 175a/175b.

The data lines 171 and the drain electrodes 175a and 175b are preferably made of a molybdenum-based metal, chromium, a refractory metal such as tantalum and titanium, or an alloy thereof, and may have a multi-layered structure which includes a refractory metal layer (not shown) and a low resistance conductive layer (not shown). Examples of the multi-layered structure include a two-layered structure of a lower chromium or molybdenum (alloy) layer and an upper aluminum (alloy) layer and a three-layered structure of a lower molybdenum (alloy) layer, an intermediate aluminum (alloy) layer, and an upper molybdenum (alloy) layer. However, the data lines 171 and the drain electrodes 175a and 175b may be made of various metals and conductive materials not explicitly listed herein.

The data lines 171 and the drain electrodes 175a and 175b may have a two-layered structure which includes a refractory metal layer (not shown) and a low resistance conductive layer (not shown), or a single-layered structure made of one of the various aforementioned materials. An example of the two-layered structure includes a lower chromium or molybdenum (alloy) layer and an upper aluminum (alloy) layer. However, as mentioned above, the data lines 171 and the drain electrodes 175a and 175b may be made of various metals and conductive materials not explicitly listed herein.

The side surfaces of the data lines 171 and the drain electrodes 175a and 175b are slanted to form an angle ranging from about 30° to about 80° with respect to the substrate surface.

The ohmic contact members 163a, 163b, 165a and 165b are interposed only between the underlying semiconductors 154a and 154b and the overlying data lines 171 and drain electrodes 175a and 175b, and have a function of reducing the contact resistance between the semiconductors 154 and the overlying layers. The semiconductors 154a and 154b have exposed portions which are not covered with the data lines 171 and the drain electrodes 175a and 175b, for example, portions disposed between the source electrodes 173a and 173b and the drain electrodes 175a and 175b.

A passivation layer 180 is formed on the data lines 171, the drain electrodes 175a and 175b, and the exposed portions of the semiconductors 154. The passivation layer 180 includes a lower film 180p made of an inorganic insulating material such as silicon nitride and silicon oxide, and an upper film 180q made of an organic material. The upper passivation film 180q preferably has a dielectric constant of less than 4.0, and it may have photosensitivity and an uneven surface. However, the passivation layer 180 may have a single-layered structure made of an inorganic insulating material or an organic insulating material.

In the passivation layer 180, a plurality of contact holes 182, 185a and 185b which expose the end portions 179 of the data lines 171 and the drain electrodes 175a and 175b, respectively, are formed. In the passivation layer 180 and the gate insulating film 140, a plurality of contact holes 181a and 181b which expose the end portions 129a and 129b of the gate lines 121a and 121b, respectively, are formed.

On the passivation layer 180, a plurality of first and second pixel electrodes 191a and 191b and a plurality of contact assistance members 81a, 81b and 82 are formed.

Figure 4:
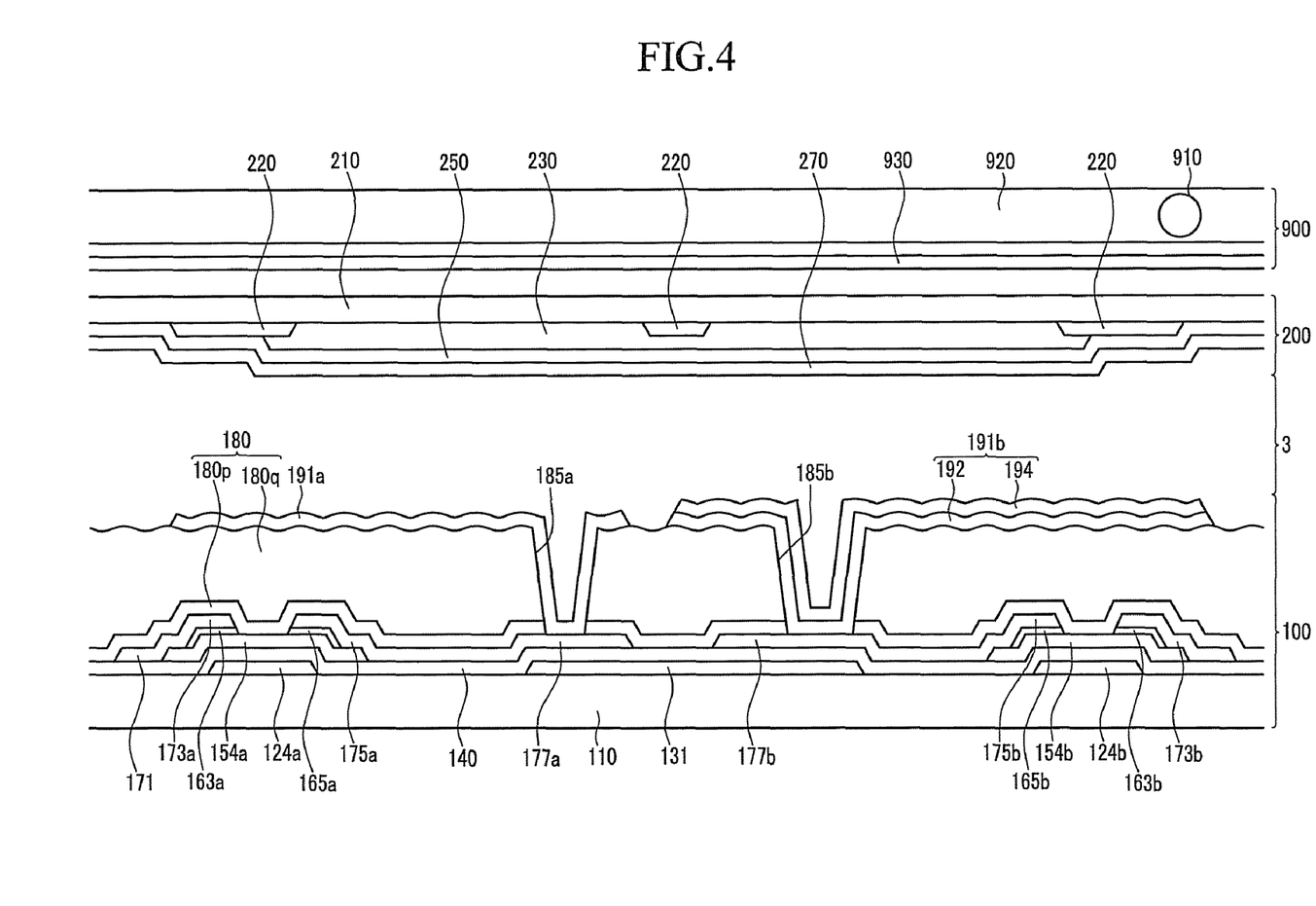
FIG. 4 is a cross-sectional view of the liquid crystal panel assembly taken along line IV-IV of FIG. 3.
Figure 5:
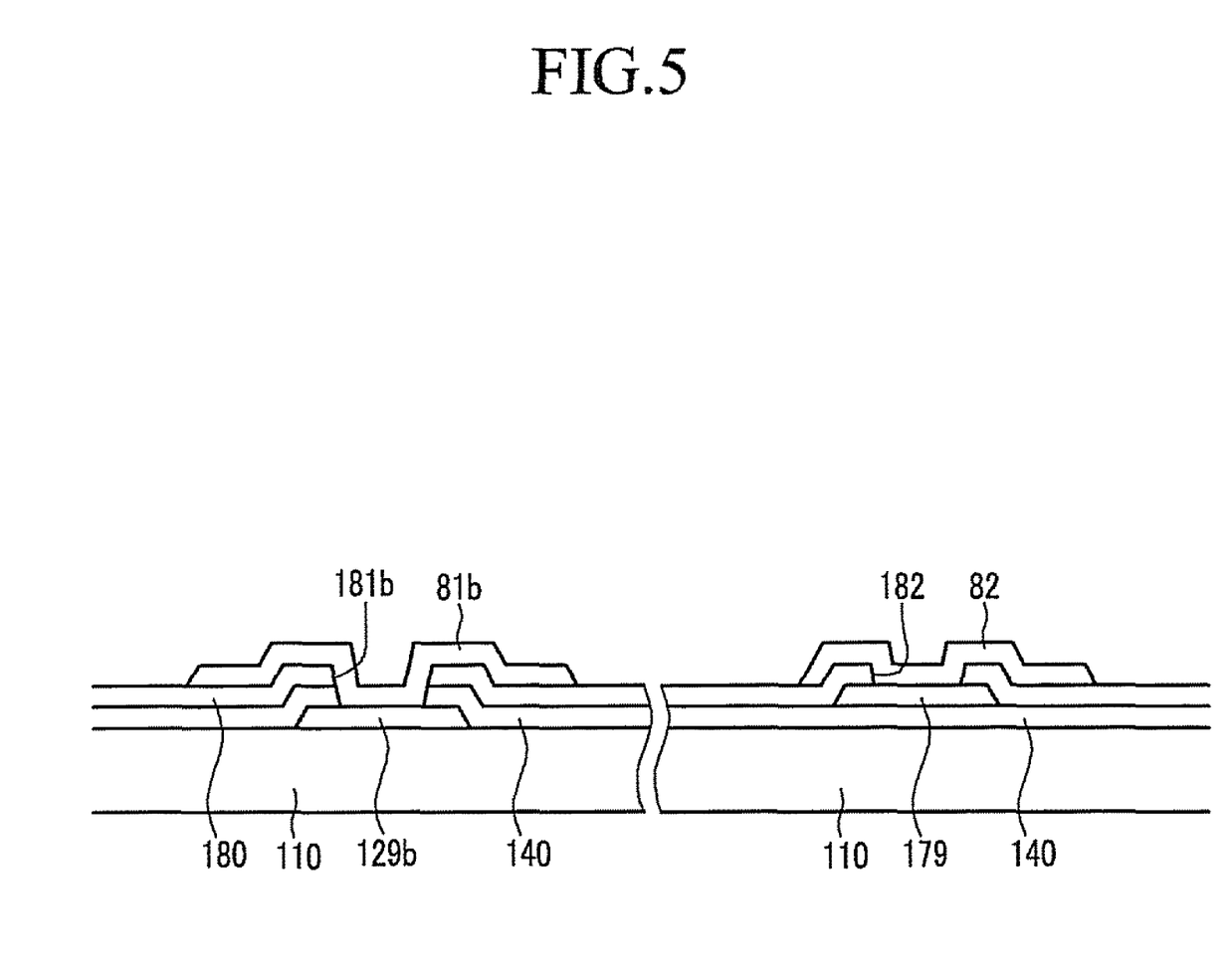
FIG. 5 is a cross-sectional view of the liquid crystal panel assembly taken along line V-V of FIG. 3.

The first pixel electrode 191a and the second pixel electrode 191b are curved along the unevenness of the passivation layer 180, and are separated from each other, as illustrated in FIG. 4. The second pixel electrode 191b includes a transparent electrode 192 and a reflective electrode 194 thereon. However, the transparent electrode 192 may be omitted in alternative exemplary embodiments.

The first pixel electrode 191a and the transparent electrode 192 are made of a transparent conductive material such as ITO and IZO, and the reflective electrode 194 is made of a reflective conductive material such as aluminum, silver, chromium, or alloys thereof. However, the reflective electrode 194 may have a two-layered structure of an upper film (not shown) made of a low resistance reflective material such as aluminum, silver, or an alloy thereof, and a lower film (not shown) made of a material having good contact characteristics to ITO and IZO, such as a molybdenum-based metal, chromium, tantalum, or titanium.

The first pixel electrode 191a is physically and electrically connected through the contact hole 185a to the first drain electrode 175a to receive data voltages from the first drain electrodes 175a. The second pixel electrode 191b is physically and electrically connected through the contact hole 185b to the second drain electrode 175b to receive data voltages from the second drain electrodes 175b. The first/second electrode 191a/191b supplied with the data voltages generates an electric field together with the common electrode 270 of the common electrode panel 200 supplied with a common voltage, so that alignment of the liquid crystal molecules of the liquid crystal layer 3 between the two pixel electrodes 191a/191b and the common electrode 270 can be determined. Polarization of light passing through the liquid crystal layer 3 changes according to the determined alignment of the liquid crystal molecules. The first and second pixel electrodes 191a and 191b and the common electrode 270 constitute liquid crystal capacitors to sustain the applied voltages even when the thin film transistors turn off.

The transflective type of liquid crystal panel assembly 300 including the thin film transistor array panel 100, the common electrode panel 200, and the liquid crystal layer 3 can be divided into a transmissive region and a reflective region which are defined by the first pixel electrode 191a and the second pixel electrode 191b, respectively.

In the transmissive region, light incident from the front surface of the liquid crystal panel assembly 300, e.g., the common electrode panel 200, passes through the liquid crystal layer 3 to exit toward the rear surface thereof, e.g., the thin film transistor array panel 100, thereby performing display of an image. In the reflective region, light entering from the front surface thereof enters into the liquid crystal layer 3, is reflected by the second pixel electrode 191b, and passes through the liquid crystal layer 3 again to exit toward the front surface thereof, thereby performing display of an image. A curve of the second pixel electrode 191b surface improves the reflection efficiency of light.

The first and second pixel electrodes 191a and 191b and the enlarged portions 177a and 177b of the first and second drain electrodes 175a and 175b connected thereto constitute storage capacitors which overlap the storage electrode lines 131 including the projections 137, and intensify the voltage sustaining capability of the liquid crystal capacitors. Some parts of the storage electrode lines 131 overlap the enlarged portion 177a of the first drain electrode 175a, and the other parts thereof overlap the enlarged portion 177b of the second drain electrode 175b. As stated above, storage capacitors of two pixels PXa and PXb having the first pixel electrode 191a or the second pixel electrode 191b are formed via one storage electrode line 131, thereby ensuring transmittance.

The contact assistance members 81a, 81b and 82 are connected through the contact holes 181a, 181b and 182 to the end portions 129a and 129b of the gate lines 121a and 121b and the end portions 179 of the data lines 171, respectively. The contact assistance members 81a, 81b and 82 have a function of aiding adhesion of the end portions 129a and 129b of the gate lines 121a and 121b and the end portions 179 of the data lines 171 to external apparatuses, and protecting these portions.

Now, the common electrode panel 200 will be described in more detail with reference to FIG. 4.

A light-blocking member 220 is formed on a dielectric substrate 210 made of transparent glass, plastic, or the like. The light-blocking member 220 is often called a black matrix, and defines a plurality of openings that face the first pixel electrode 191a and the second pixel electrode 191b. The light-blocking member 220 prevents light leakage between the first pixel electrode 191a and the second pixel electrode 191b.

A plurality of color filters 230 is formed on the substrate 210. Most portions of each of the color filters 230 are disposed in the openings surrounded by the light-blocking member 220. The color filters 230 may extend along the first pixel electrode 191a and the second pixel electrode 191b in a longitudinal direction to form stripes. Each of the color filters 230 can represent one of primary colors such as red, green and blue, for example, but is not limited thereto.

An overcoat 250 is formed on the color filters 230 and the light-blocking member 220. The overcoat 250 may be made of an (organic) insulating material, and protects the color filters 230, prevents the color filters 230 from being exposed, and provides a flat surface. However, the overcoat 250 may be omitted in alternative exemplary embodiments.

The common electrode 270 is formed on the cover film 250. The common electrode 270 is preferably made of a transparent conductive material such as ITO and IZO.

An alignment film (not shown) for aligning the liquid crystal layer 3 is coated on inner or outer surfaces of the panels 100 and 200. Polarizers (not shown) are provided on inner or outer surfaces of the panels 100 and 200.

The liquid crystal layer 3 may be vertically or horizontally aligned.

The liquid crystal panel assembly 300 further includes a plurality of elastic spacers (not shown) for supporting the thin film transistor array panel 100 and the common electrode panel 200 to form a suitable gap therebetween.

The liquid crystal panel assembly 300 may further include a sealant (not shown) for bonding the thin film transistor array panel 100 and the common electrode panel 200 together. The sealant is disposed at an edge of the common electrode panel 200.

Referring to FIG. 1 again, the gray voltage generator 800 generates two grayscale voltage sets (reference grayscale sets) corresponding to a transmittance of the pixels PX. One of the two grayscale sets has a positive value with respect to the common voltage Vcom, and the other grayscale set has a negative value with respect to the common voltage Vcom.

The gate driver 400 includes first and second gate driving circuits 400L and 400R, and the gate driving circuits 400L and 400R are connected to the gate lines $G_1$-$G_{2n}$ of the liquid crystal panel assembly 300 to apply gate signals formed in a combination of a gate-on voltage Von and a gate-off voltage Voff to the gate lines $G_1$-$G_{2n}$.

The first gate driving circuit 400L is disposed at a left side of the liquid crystal panel assembly 300 and applies gate signals to first gate lines $G_{2j-1}$ (j=1, 2, . . . n) (GLa of FIG. 2). The second gate driving circuit 400R is disposed at a right side of the liquid crystal panel assembly 300 and applies gate signals to second gate lines $G_{2j}$ (GLb of FIG. 2). The first gate driving circuit 400L and the second gate driving circuit 400R apply a gate-on voltage Von, starting from the gate line disposed on the uppermost side of the liquid crystal panel assembly 300, and alternately output the gate-on voltage Von.

The data driver 500 is connected to the data lines $D_1$-$D_m$ of the liquid crystal display panel assembly 300 to select a gray voltage from the gray voltage generator 800 and apply it to the data lines $D_1$-$D_m$ as a data signal.

The backlight unit 900 is, as shown in FIG. 4, disposed to be close to the common electrode panel 200 rather than the thin film transistor array panel 100 of the liquid crystal panel assembly 300, to irradiate light toward the thin film transistor array panel 100 from the common electrode panel 200. The backlight unit 900 may include a light source 910 for generating light, a light conducting plate 920 for guiding and diffusing light from the light source 910 toward the liquid crystal panel assembly 300, and an optical sheet 930. The light conducting plate 920 may have a shape similar to that of the common electrode panel 200, and the optical sheet 930 may be disposed between the light conductive plate 920 and the common electrode panel 200. A fluorescent lamp or light emitting diode LED may be used as the light source 910, and may be arranged at a side of the light conductive plate 920.

Referring again to FIG. 1, the signal controller 600 externally receives input image signals R, G and B for images on the front and rear surfaces of the liquid crystal panel assembly 300 from the outside, processes them to generate output image signals DAT, and controls the gate driver 400, the data driver 500, and the like.

Such a signal controller 600 will be described in more detail later.

Each of the drivers 400, 500, 600 and 800 may be directly mounted in a form of at least one integrated circuit chip on the liquid crystal display panel assembly 300, may be attached in a form of a tape carrier package ("TCP") on a flexible printed circuit ("FPC") film (not shown) in the liquid crystal display panel assembly 300, or may be mounted on a separate printed circuit board ("PCB") (not shown). Alternatively, these drivers 400, 500, 600 and 800 together with the signal lines $G_1$-$G_{2n}$ and $D_1$-$D_m$ and the thin film transistor switching elements Qa and Qb may be directly mounted on the liquid crystal display panel assembly 300. Further, the drivers 400, 500, 600 and 800 may be integrated as a single chip, in which case, at least one of them or at least one circuit device constituting them may be located outside of the single chip.

Now, the operation of the liquid crystal display device will be described in more detail.

The signal controller 600 is supplied with input image signals R, G and B and input control signals controlling the display thereof from an external graphics controller (not shown). The input image signals R, G and B contain luminance information of each pixel PXa/Pxb, and the luminance has a predetermined number, for example, 1024 (=$2^{10}$), 256 (=$2^8$) or 64 (=$2^6$) gray scales. The input control signals include, for example, a vertical synchronization signal Vsync, a horizontal synchronization signal Hsync, a main clock signal MCLK and a data enable signal DE.

In response to the input image signals R, G and B and the input control signals, the signal controller 600 processes the input image signals R, G and B suitably for operation of the liquid crystal panel assembly 300 and generates output image signals DAT, gate control signals CONT1 and data control signals CONT2, and then outputs the gate control signals CONT1 to the gate driver 400 and the data control signals CONT2 and the output image signals DAT to the data driver 500.

The gate control signals CONT1 include a scanning start signal STV for instructing the start of scanning and at least one clock signal for controlling an output time of the gate-on voltage Von. The gate control signals CONT1 may further include an output enable signal OE for defining a duration of the gate-on voltage Von.

The data control signals CONT2 include a horizontal synchronizing start signal STH for informing of a beginning of transmission of digital output image signals DAT for a row of pixels PXa and PXb, a load signal LOAD for instructing to apply analog data voltages to the data lines $D_1$-$D_m$, and a data clock signal HCLK. The data control signals CONT2 may further include a reverse signal RVS for reversing a polarity of the analog data voltages with respect to the common voltage Vcom (hereinafter, a polarity of the analog data voltages will be abbreviated as a polarity of the data voltages).

Responsive to the data control signals CONT2 from the signal controller 600, the data driver 500 receives digital image signals DAT for a row of pixels PXa and PXb from the signal controller 600, converts the digital output image signals DAT into analog data voltages by selecting grayscale voltages corresponding to the output image signals DAT, and then applies the analog data voltages to corresponding data lines $D_1$-$D_m$.

The gate driver 400 applies the gate-on voltage Von to the gate lines $G_1$-$G_{2n}$ in response to the gate control signals CONT1 from the signal controller 600, thereby turning on switching elements Qa/Qb connected to the gate lines $G_1$-$G_{2n}$. The data voltages applied to the data lines $D_1$-$D_m$ are applied to corresponding pixels PXa/PXb through turned-on switching elements Qa/Qb.

The first gate driving circuit 400L and the second gate driving circuit 400R alternately apply the gate-on voltage Von, and accordingly the first pixel PXa and the second pixel PXb are alternately supplied with the data voltages.

The difference between the data voltage applied to the pixels PXa and PXb and the common voltage Vcom becomes a charged voltage of the liquid crystal capacitors Clca and Clcb, that is, a pixel voltage. Alignment of the liquid crystal molecules varies according to the intensity of the pixel voltage. Polarization of light passing through the liquid crystal layer 3 changes according to the alignment of the liquid crystal molecules. The change in the polarization results in a change in transmittance of the light due to the polarizers attached to the liquid crystal panel assembly 300. Thus, the pixels PXa and PXb display a luminance represented by the grayscales of the output image signals DAT.

As explained above, the first pixel PXa displays images on the rear surface of the liquid crystal panel assembly 300, and the second pixel PXb displays images on the front surface of the liquid crystal panel assembly 300.

By repeating the above-mentioned procedure every 2 horizontal periods (in which 1 horizontal period is equal to one period of the horizontal synchronization signal Hsync and the data enable signal DE), all gate lines $G_1$-$G_{2n}$ are sequentially supplied with the gate-on voltage Von, thereby applying the data voltages to all pixels PXa and PXb to display images for the front surface of one frame and images for the rear surface of one frame.

Subsequently, two different kinds of pixels PXa and PXb can display images with a different constant phase on the front and rear surfaces of the liquid crystal panel assembly. The sizes of the images on the front and rear surfaces may not be identical to each other, and may be varied according to design.

When one frame ends, the next frame starts, and a state of the reverse signal RVS applied to the data driver 500 is controlled so that the polarity of the data signal applied to each of the pixels PXa and PXb is opposite to the polarity in the previous frame (frame inversion). At this time, even in one frame, according to the characteristics of the reverse signals RVS, the polarities of the data voltages flowing through the data lines may be inverted (row inversion and dot inversion), and the polarities of the data voltages applied to one pixel row may be different from each other (column inversion and dot inversion).

Now, the signal controller 600 according to the exemplary embodiment of the present invention will be described in more detail with reference to FIGS. 6 to 8.

Figure 6:
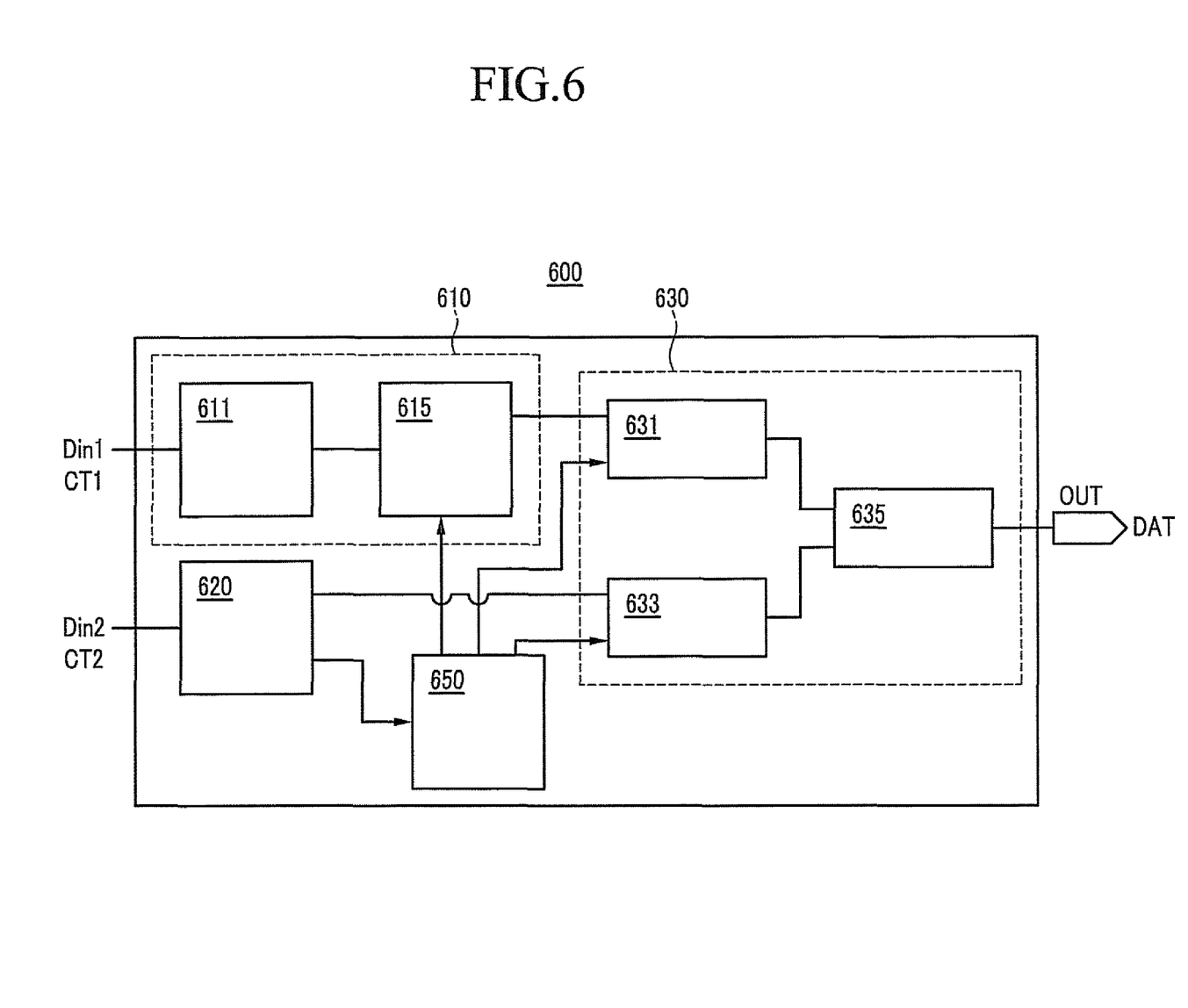
FIG. 6 is a block diagram of a signal controller according to an exemplary embodiment of the present invention.

FIG. 6 is a block diagram of a signal controller according to an exemplary embodiment of the present invention.

Referring to FIG. 6, the signal controller 600 according to an exemplary embodiment of the present invention includes a first receiver 610, a second receiver 620, a signal arrangement unit 630, and a timing control unit 650, and the signal controller 600 generates output image signals DAT based on input image signals R, G and B.

The first receiver 610 and the second receiver 620 are interfaces between an external system and a liquid crystal display device. The first/second receivers 610/620 receive first/second input image signals Din1/Din2 and first/second control signals CT1/CT2. The first input image signal Din1 is an image signal to be displayed on one of the front and rear surfaces of the liquid crystal panel assembly 300, and the second input image signal Din2 is an image signal to be displayed on the other surface thereof. The input image signals R, G and B to be displayed on the front surface are related to the second pixels PXb, e.g., the second pixel electrode 191b in FIGS. 3 and 5, and the input image signals R, G and B to be displayed on the rear surface are related to the first pixels PXa, e.g., the first pixel electrode 191b in FIGS. 3 to 5.

The first receiver 610 is, for example, a central processing unit ("CPU") interface, and includes a receiving terminal 611 and a frame memory 615. The receiving terminal 611 receives the first input image signal Din1, and processes the received first input image signal Din1 in response to the first input control signal CT1 to output the same to the frame memory 615. The receiving terminal 611 may include a plurality of registers (not shown) for processing the first input image signal Din1 in response to the first input control signal CT1. Such receiving terminal 611 can be controlled in response to the first input image signal CT1 according to a user's intention. The frame memory 615 stores the processed first input image signal Din1.

The second receiver 620 is, for example, an RGB interface. The second receiver 620 does not include a separate frame memory, and it receives the second input image signal Din2 and the second input control signal CT2. The second control signal CT2 is a signal representing time information of the second input image signal Din2, for example, a vertical synchronization signal Vsync, a horizontal synchronization signal Hsync, and a data enable signal DE.

The first receiver 610 and the second receiver 620 may receive the input image signals Din1 and Din2 in an alternating fashion. For example, the first receiver 610 firstly receives the first input image signal Din1 to store it in the frame memory 615, and thereafter the second receiver 620 starts to receive the second input image signal Din2.

Alternatively, the first receiver 610 and the second receiver 620 may simultaneously receive the input image signals Din1 and Din2. In this case, the first input image signal Din1 forming a pair with the second input image signal Din2, being received by the second receiver 620, may enter into the first receiver 610 in advance and be stored in the frame memory 615. The first input image signal Din1, currently being inputted into the first receiver 610, may form a pair with the second input image signal Din2 of the next frame.

The signal arrangement unit 630 includes first, second and third line memories 631, 633 and 635, and determines whether the input image signals Din1 and Din2 of the receivers 610 and 620, respectively, are signals to be displayed on the front surface of the liquid crystal panel assembly 300 or on the rear surface thereof. The signal arrangement unit 630 sequentially arranges the signals according to the result of determination to generate output image signals DAT, and outputs them to an output terminal OUT.

The first line memory 631 is connected to the frame memory 615 of the first receiver 610, and receives the first input image signal Din1 for one pixel row from the frame memory 614 and stores it. The second line memory 633 is connected to the second receiver 620, and receives the second input image signal Din2 from the second receiver 620 and stores it in units of one pixel row.

The third line memory 635 is connected between the first and second line memories 631 and 633 and the output terminal OUT. The third line memory 635 alternately reads the first and second input image signals Din1 and Din2 stored in the first line memory 631 and the second line memory 633, respectively, and alternately outputs the read input image signals Din1 and Din2 in the order of reading. The image signals outputted by the third line memory 635 become output image signals DAT.

The issue of which of the two line memories 631 and 633 is to be accessed first by the third memory 635 in order to extract image signals R, G and B is determined according to which is for use in the front display and which is for use in the rear display between the first input image signal Din1 and the second input image signal Din2. For example, if a pixel row of the first pixels PXa used for rear display receives a data voltage first, and a pixel row of the second pixels PXb used for front display receives a data voltage later, the third line memory 635 first accesses the memory storing the image signal for front display between the first and second memories 631 and 633.

In the meantime, since the first line memory 631 and the second line memory 633 should be read alternately, the reading frequency may be twice that of the writing frequency.

If the first receiver 610 and the second receiver 620 simultaneously receive the input image signals Din1 and Din2, the frame frequency of the output image signals DAT is twice the frame frequency of the input image signals Din1 and Din2. That is, whenever the first or second input image signal Din1 or Din2 for one pixel is inputted, a data voltage is applied to one row of the first pixels and one row of the second pixels.

In the meantime, the signal control unit 650 is for synchronization of the frame memory 615 and the line memories 631, 633 and 635. The time control unit 650 receives a second control signal CT2, which is a time control signal, from the second receiver 620, and generates a control signal for controlling the input and output of the memories 615, 631, 633 and 635.

Specifically, the time control unit 650 provides the frame memory 615 with a control signal for outputting the first input image signal Din1 of one pixel row to the first line memory 631 by synchronization with the second receiver 620 when the second receiver 620 outputs the second input image signal Din2 of one pixel row to the second line memory 633. The time control unit 650 also provides a control signal to the first and second memories 631 and 633 for setting the output order of the first line memory 631 and second line memory 633, respectively. Further, the time control unit 650 provides a control signal to the third line memory 635 for controlling the third line memory 635.

As described above, by using two interfaces of different types, it is possible to display images on both opposing surfaces of the liquid crystal panel assembly 300 with only one frame memory 615.

Figure 7:
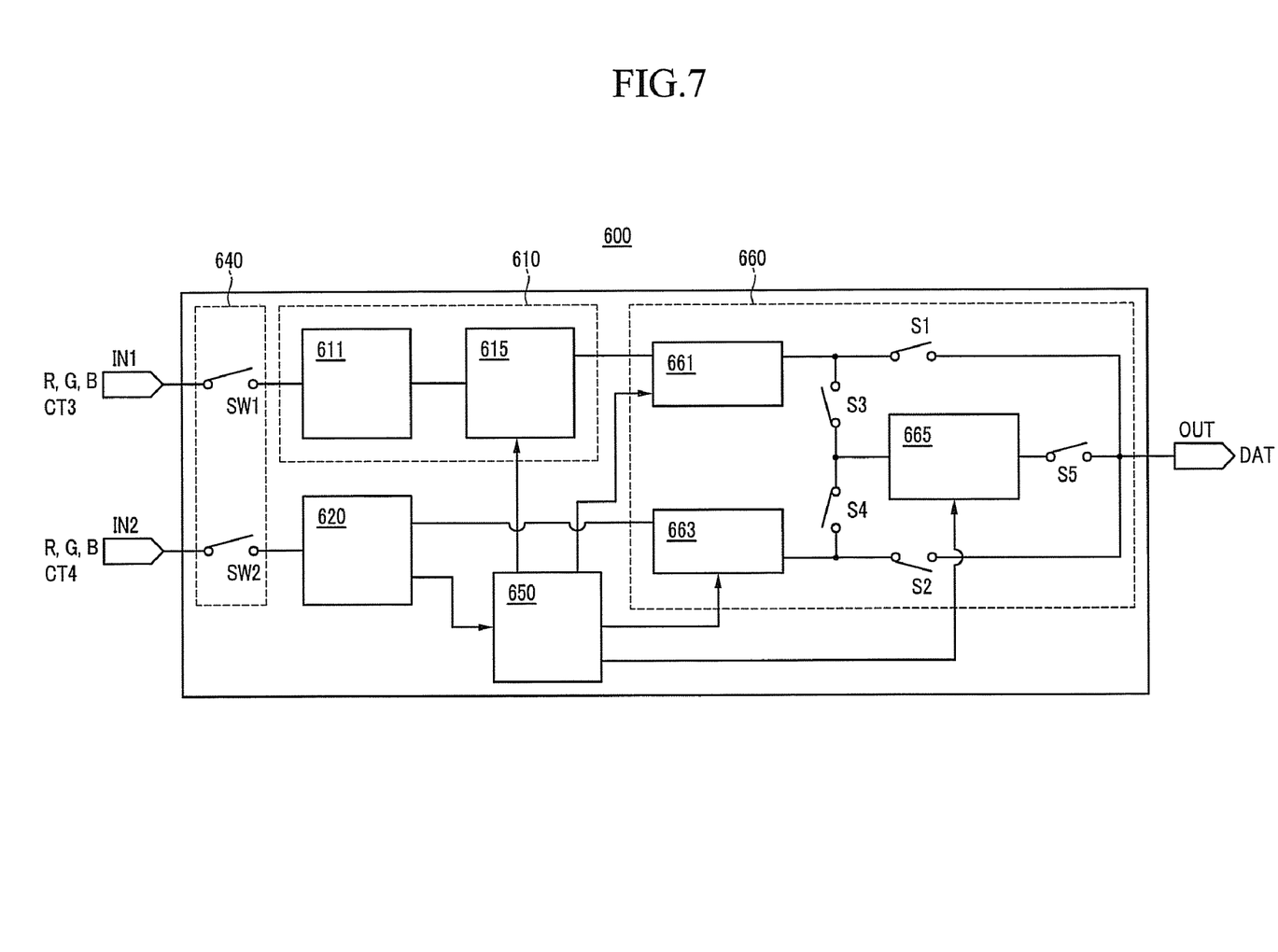
FIG. 7 is a block diagram of a signal controller according to another exemplary embodiment of the present invention.
Figure 8:
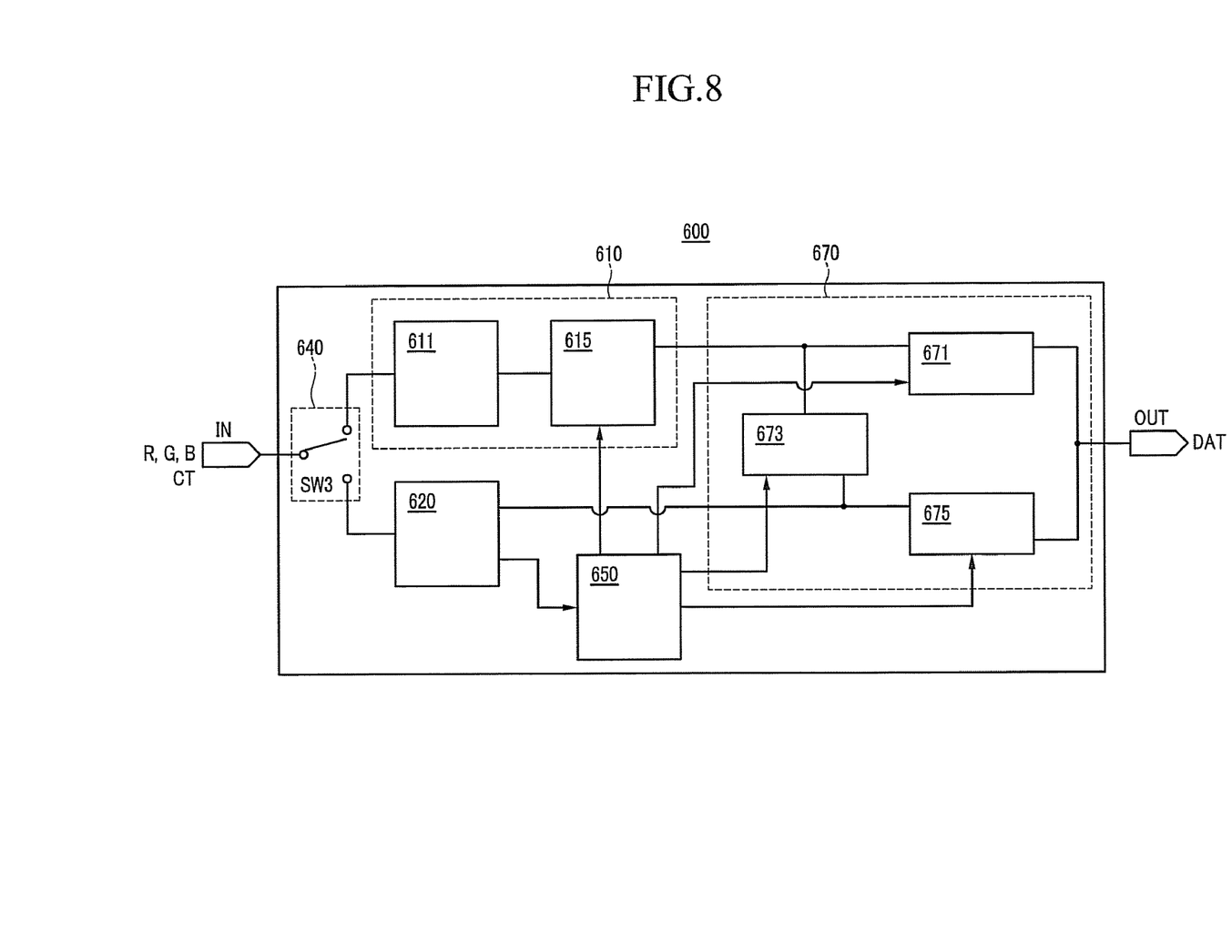
FIG. 8 is a block diagram of a signal controller according to still another exemplary embodiment of the present invention.

In some cases, identical images may be displayed on both opposing surfaces of the liquid crystal panel assembly 300, and FIGS. 7 and 8 show an example thereof. Here, the displaying of identical images means that an image viewed from the front surface of the liquid crystal panel assembly 300 and an image viewed from the rear surface thereof are identical to each other.

FIG. 7 is a block diagram of a signal controller according to another exemplary embodiment of the present invention.

An external system is able to transmit input image signals in a different interface method depending on the characteristics of images. For example, if an image to be displayed is a still image, the image signal is transmitted in a CPU interface method. On the contrary, if an image to be displayed is a moving image, the image signal is transmitted in an RGB interface method. The signal controller 600 as shown in FIG. 7 can be adapted to such a case.

Referring to FIG. 7, the signal controller 600 according to another exemplary embodiment of the present invention includes a selection unit 640, a first receiver 610, a second receiver 620, a signal arrangement unit 660, and a timing control unit 650, and has two input terminals, e.g., first and second input terminals IN1 and IN2.

The first and second receivers 610, 620 and the time control unit 650 are identical to those of the signal controller 600 of FIG. 6.

The selection unit 640 includes a first switch SW1 connected between the first input terminal IN1 and the first receiver 610 and a second switch SW2 connected between the second input terminal IN2 and the second receiver 620.

The first and second switches SW1 and SW2 are selectively operated depending on the interface method of input image signals R, G and B, and transmit the input image signals R, G and B to the corresponding receivers 610 and 620. The operation of the first and second switches SW1 and SW2 can be externally controlled through control signals CT3 and CT4 inputted together with the input image signals R, G and B.

In this manner, only one of the two receivers 610 and 620 is operated, and the other one is not operated, thereby reducing power consumption.

The signal arrangement unit 660 includes first, second and third line memories 661, 663 and 665, and a plurality of switches S1-S5 connected thereto.

The first line memory 661 is connected to a frame memory 615 of the first receiver 610, the second line memory 663 is connected to the second receiver 620, and the third memory 665 is connected to an output terminal OUT.

The switch S1 is connected between the first line memory 661 and the output terminal OUT, the switch S2 is connected between the second line memory 663 and the output terminal OUT, the switch S3 is connected between the first line memory 661 and the third line memory 665, the switch S4 is connected between the second line memory 663 and the third line memory 665, and the switch S5 is connected between the third line memory 665 and the output OUT.

If the first receiver 610 operates, the switches S1, S3 and S5 are turned on, and if the second receiver 620 operates, the switches S2, S4 and S5 are turned on. The switches S1-S4 and the switch S5 operate in an alternating fashion.

An example of the operation of the first receiver 610 will be described.

First, when the switches S1 and S3 are turned on, the stored input image signals R, G and B of the first line memory are output to the output terminal OUT through the switch S1, and transmitted to the third line memory 665 through the switch S3 and stored therein.

When the output of the first line memory 661 is finished, the switches S1 and S3 are turned off to cut off the output of the first line memory 661, and the switch S5 is turned on to output the input image signals R, G and B stored in the third line memory 665 to the output terminal OUT.

The switches S2, S4 and S5 operate in the same manner as described above when the second receiver 620 operates.

As described above, in a case where the liquid crystal display device having two interfaces of different types displays identical images on both opposing surfaces, it is possible to generate output image signals DAT for displaying identical images on both opposing surfaces of the liquid crystal panel assembly 300 while reducing power consumption by stopping one of the interfaces.

Meanwhile, when the signal controller 600 of FIG. 7 displays different images on both surfaces of the liquid crystal panel assembly 300, the first and second switches SW1 and SW2 of the selection unit 640 are simultaneously turned on to simultaneously operate the first and second receivers 610 and 620, and the switches S3, S4 and S5 are turned on and the switches S1 and S2 are turned off. In this manner, the signal arrangement unit 660 of FIG. 7 can operate in the same manner as the signal controller 600 of FIG. 6.

Next, the signal controller 600 according to still another exemplary embodiment will be described with reference to FIG. 8.

FIG. 8 is a block diagram of a signal processor according to still another exemplary embodiment of the present invention.

The signal controller as shown in FIG. 8 can be adapted to a case where the interface method of an external system is fixed to any one method.

Referring to FIG. 8, the signal controller 600 according to the present exemplary embodiment includes a selection unit 640, a first receiver 610, a second receiver 620 and a time control unit 650 having one input terminal IN.

The first and second receivers 610 and 620 and the time control unit 650 are identical to those of the signal controller 600 of FIG. 6.

The selection unit 640 includes one switch SW3 for connecting one of the first and second receivers 610 and 620 to the input terminal IN.

The switch SW3 of the selection unit 640 connects the input terminal IN and the first receiver 610 or connects the input terminal IN and the second receiver 620 depending on the interface method of input image signals R, G and B to transmit the input image signals R, G and B to the receivers 610 and 620. The operation of the switch SW3 can be externally controlled through a control signal CT inputted together with the input image signals R, G and B.

The signal arrangement unit 670 includes first and second line memories 671 and 675 and a delay buffer 673. The first line memory 671 is connected between the first receiver 610 and an output terminal OUT. The second line memory 620 is connected between the second receiver 620 and the output terminal OUT. The delay buffer 673 is connected to the first and second receivers 610 and 620 and the memories 671 and 675, and delays an input signal by a predetermined time and sends it.

In the signal controller 600 as shown in FIG. 8, only one of the two receivers 610 and 620 is operated, and the other one is not operated, thereby reducing power consumption. For instance, it is assumed that only the first receiver 610 operates. In this case, an image signal outputted from the first receiver 610 is stored in the first line memory 671, and at the same time is stored in the delay buffer 673. The image signal stored in the first line memory 671 is outputted directly, and the image signal stored in the delay buffer 673 is delayed by a predetermined time and stored in the second line memory 675, and then outputted when the output of the first line memory 671 is finished. The duration of delay in the delay buffer 673 is equal to the time during which the first line memory 671 outputs an image signal.

In the meantime, in order to display images with constant phases on both front and rear surfaces of one liquid crystal panel assembly 300, when viewed from one surface, the image displayed on the opposite side surface is a reverse image whose left and right or top and bottom are reversed. Therefore, for example, in a case where the input image signals R, G and B are sequentially arranged with respect to the image on the front surface of the liquid crystal panel assembly 300, in order to display image with constant phases on the rear surface, it is necessary to reverse the order of image signals to be displayed on the rear surface for outputting them.

The signal controller 600 as shown in FIG. 6 receives an input image signal for front display and an input image signal for rear display separately. Thus, when an external apparatus sends the input image signal for rear display to the signal controller 600, it can be sent in order so as to be directly outputted.

However, in FIGS. 7 and 8, the signal controller 600 receives one image signal and outputs it twice. Thus, when the image signal is outputted for use in the rear display, the order thereof needs to be changed. For this, any one of the line memories 661, 663, 665, 671 and 675 is writable and readable in reverse order. For example, in FIG. 8, the first line memory 671 is writable in order, and the second line memory 675 is writable in reverse order.

As seen from the above, according to the present invention, by using two different interfaces in the liquid crystal display device, memories can be reduced by driving transmissive pixels and reflective pixels independently, and different normal images can be displayed on both surfaces of the display panel. When the same image is displayed on both surfaces, only one interface is selectively driven to thereby reduce power consumption.

While the present invention has been described in connection with what is presently considered to be practical exemplary embodiments, it is to be understood that the present invention is not limited to the disclosed exemplary embodiments, but, on the contrary, is intended to cover various modifications and equivalent arrangements included within the spirit and scope of the appended claims.

What is claimed is:

1. A dual display device, comprising:
a display panel having a first surface and an opposing second surface, and including a plurality of first pixels displaying an image on the first surface and a plurality of second pixels displaying an image on the second surface;
a gate driver supplying gate signals to the first and second pixels;
a signal controller including first and second receivers receiving input image signals, and
generating first and second output image signals based on the input image signals; and
a data driver analog-converting the first and second output image signals to generate first and second data voltages, respectively, and supplying the first and second data voltages to the first and second pixels, respectively,
wherein the first receiver comprises a first memory unit which stores the image signals,
wherein the signal controller further comprises a signal arrangement unit generating the first output image signal and the second output image signal based on the input image signals received from at least one of the first and second receivers, and outputting the first output image signal and the second output image signal to the data driver in an alternating fashion, and
wherein the input image signals comprises a first input image signal to be displayed on the first surface and a second input image signal to be displayed on the second surface,
the first receiver receives the first input image signal to store the same in the first memory unit,
the second receiver receives the second input image signal to output the same, and
the signal arrangement unit generates the first output image signal from the first input image signal and the second output image signal from the second input image signal.

2. The dual display device of claim 1, wherein the first pixels and the second pixels are arranged in an alternating fashion.

3. The dual display device of claim 2, wherein the display panel comprises data lines connected to the first and second pixels, and
the data driver applies the first data voltage and the second data voltage to the data lines in an alternating fashion.

4. The dual display device of claim 3, wherein the first pixel comprises a transmissive pixel electrode, and the second pixel includes a reflective pixel electrode.

5. The dual display device of claim 4, further comprising a backlight unit irradiating light toward the display panel,
wherein the transmissive pixel electrode transmits the light from the backlight unit toward the first surface of the display panel, and
the reflective pixel electrode reflects the light from the backlight unit toward the second surface thereof.

6. The dual display device of claim 1, wherein the first receiver is controlled by an external control signal.

7. The dual display device of claim 1, wherein the signal arrangement unit comprises:
a second memory unit receiving the first input image signal from the first memory unit to store the same therein;
a third memory unit receiving the second input image signal from the second receiver to store the same therein; and
a fourth memory unit receiving the first input image signal and the second input image signal from the second memory unit and the third memory unit in an alternating fashion to store the same therein.

8. The dual display device of claim 7, wherein an image of the first pixels and an image of the second pixels are different from each other.

9. The dual display device of claim 1, wherein an image viewed from the first surface of the display panel and an image viewed from the second surface thereof are identical to each other.

10. The dual display device of claim 9, wherein the signal controller generates the first output image signal and the second output image signal based on the input image signals received from at least one of the first and second receivers.

11. The dual display device of claim 10, wherein the signal controller further comprises a first switching unit selecting one of the first and second receivers and transmitting the input image signals thereto.

12. The dual display device of claim 11, wherein the first switching unit comprises:
a first switch monitoring a connection between the first receiver and the input image signals; and
a second switch monitoring a connection between the second receiver and the input image signals and operating opposite to the first switch.

13. The dual display device of claim 11, wherein the first switching unit comprises a switch connected to the input image signals and selectively connected to one of the first and second receivers.

14. The dual display device of claim 11, wherein the signal arrangement unit comprises a delay unit which delays the input image signals.

15. The dual display device of claim 14, wherein the signal arrangement unit further comprises:
a second memory unit connected to the first receiver; and
a third memory unit connected to the second receiver, and the signal arrangement unit has an output terminal.

16. The dual display device of claim 15, wherein the delay unit receives the input image signals from one of the second and third memory units.

17. The dual display device of claim 16, wherein the signal arrangement unit comprises a second switching unit monitoring the connection among the second memory unit, the third memory unit, the delay unit and the output terminal.

18. The dual display device of claim 17, wherein the second switching unit comprises:
a first switch monitoring a connection between the second memory unit or the third memory unit and the output terminal;
a second switch monitoring a connection between the second memory unit or the third memory unit and the delay unit; and
a third switch monitoring a connection between the delay unit and the output terminal.

19. The dual display device of claim 18, wherein a conduction time of the first switching unit and the second switching unit are different from a conduction time of the third switching unit.

20. The dual display device of claim 15, wherein the delay unit receives the input image signals from one of the first and second receivers and outputs the input image signals to one of the second and third memory units.

21. The dual display device of claim 13, wherein the signal arrangement unit outputs the first output image signal and the second output image signal in a reverse order.

* * * * *